(12) United States Patent
Beckert et al.

(10) Patent No.: US 6,175,789 B1
(45) Date of Patent: *Jan. 16, 2001

(54) VEHICLE COMPUTER SYSTEM WITH OPEN PLATFORM ARCHITECTURE

(75) Inventors: Richard D. Beckert, Lake Stevens; Mark M. Moeller, Bellingtham; William S. Wong, Redmond, all of WA (US)

(73) Assignee: Microsoft Corporation, Redmond, WA (US)

( * ) Notice: Under 35 U.S.C. 154(b), the term of this patent shall be extended for 0 days.

This patent is subject to a terminal disclaimer.

(21) Appl. No.: 09/394,360

(22) Filed: Sep. 10, 1999

Related U.S. Application Data

(63) Continuation of application No. 08/668,781, filed on Jun. 24, 1996, now Pat. No. 6,009,363, which is a continuation-in-part of application No. 08/564,586, filed on Nov. 29, 1995, now Pat. No. 5,794,164.

(51) Int. Cl.[7] .............................. G06F 7/00; G01M 17/00
(52) U.S. Cl. ................................ 701/33; 701/1; 361/679; 361/683; 361/731; 361/814; 248/27.1; 455/346; 455/348; 340/825.25
(58) Field of Search .................................. 701/1, 29, 33; 340/815.41, 436, 438, 439, 461, 825.25; 455/456, 345, 348; 370/522, 476, 537; 361/814, 679, 728, 747, 683, 686, 600, 729, 730, 731; 248/27.1, 27.3, 551

(56) References Cited

U.S. PATENT DOCUMENTS

| | | |
|---|---|---|
| 4,068,175 | 1/1978 | Maniaci ........................ 455/345 |
| 4,207,511 | 6/1980 | Radtke .............................. 320/6 |
| 4,365,280 | 12/1982 | Crosetti et al. ................. 360/137 |
| 4,477,764 | 10/1984 | Pollard ............................ 320/62 |
| 4,481,512 | 11/1984 | Tscheulin et al. ........... 340/825.25 |
| 4,497,038 | 1/1985 | Diepold-Scharnitzky et al. . 395/290 |
| 4,868,715 | 9/1989 | Putman et al. ................. 361/814 |
| 4,895,326 | 1/1990 | Nimpoeno et al. ............. 248/27.1 |
| 4,911,386 | 3/1990 | Putman et al. ................. 248/27.1 |
| 5,060,229 | 10/1991 | Tyrell et al. ................... 370/522 |
| 5,104,071 | 4/1992 | Kowalski ....................... 248/27.1 |
| 5,143,343 | 9/1992 | Katz .............................. 248/551 |
| 5,198,696 | 3/1993 | Dennis .......................... 307/10.1 |
| 5,316,868 | 5/1994 | Dougherty et al. ................ 429/9 |
| 5,424,709 | 6/1995 | Tal ............................ 340/310.01 |
| 5,488,283 | 1/1996 | Dougherty et al. .............. 320/15 |
| 5,569,997 | 10/1996 | Berger ........................... 320/15 |
| 5,610,376 | 3/1997 | Takagi et al. ................. 200/50.01 |
| 5,641,953 | 6/1997 | Fisher, Jr. ................... 200/50.12 |
| 5,794,164 | * 8/1998 | Beckert et al. .................... 701/1 |
| 5,859,628 | * 1/1999 | Ross et al. ..................... 345/173 |
| 6,009,363 | * 12/1999 | Beckert et al. .................. 701/33 |

* cited by examiner

Primary Examiner—Jacques H. Louis-Jacques
(74) Attorney, Agent, or Firm—Lee & Hayes, PLLC

(57) ABSTRACT

A vehicle computer system has a housing sized to be mounted in a vehicle dashboard or other appropriate location. A computer is mounted within the housing and executes an open platform, multi-tasking operating system. The computer runs multiple applications on the operating system, including both vehicle-related applications (e.g., vehicle security application, vehicle diagnostics application, communications application, etc.) and non-vehicle-related applications (e.g., entertainment application, word processing, etc.). The applications may be supplied by the vehicle manufacturer and/or by the vehicle user.

20 Claims, 10 Drawing Sheets

VEHICLE COMPUTER SYSTEM WITH OPEN PLATFORM ARCHITECTURE

REFERENCE TO RELATED APPLICATIONS

This is a continuation of U.S. patent application Ser. No. 08/668,781, filed Jun. 24, 1996, which issued as U.S. Pat. No. 6,009,363, on Dec. 28, 1999. Patent '363 is a continuation-in-part of U.S. patent application Ser. No. 08/564,586, filed Nov. 29, 1995, which issued as U.S. Pat. No. 5,794,164, on Aug. 11, 1998.

TECHNICAL FIELD

This invention relates to computer systems for vehicles.

BACKGROUND

Modern vehicles are typically equipped with several independent electronic systems. For instance, most modern vehicles have a sound system and a security system. The sound system usually consists of an AM/FM radio, a cassette or CD (compact disk) player, an equalizer/amplifier, and speakers. The radio and player are arranged in a metal casing or housing that is mounted in a dashboard of the vehicle. The housing has a standardized size, often expressed in terms of DINs (Deutsche Industry Normen), to ensure that the sound system is compatible with and can be retrofit into most vehicle dashboards.

The security system is entirely separate from the sound system. The security system generally consists of security sensors placed throughout the vehicle, and a central application-specific integrated circuit (ASIC) to monitor the sensors and determine whether security is being jeopardized. Security System also controls actuators to lock/unlock doors or windows, and an alarm or siren.

Most late model vehicles are also constructed with a diagnostic system that analyzes performance of the vehicle's engine, transmission and fuel system, and other components (1996 or later for OBD II, 1993 or later for OBD I). The diagnostic system can be coupled to an external computer to download or monitor diagnostic information that is useful to a vehicle mechanic during servicing of the vehicle. Additionally, the diagnostic system might include dashboard displays that inform the driver of various operating conditions.

In some recent models, vehicles are being equipped with a navigation system that incorporates a global positioning system (GPS) receiver. The GPS receiver has an antenna to receive signals from a satellite network. The vehicle navigation system uses the satellite positioning signals to compute coordinates that locate the vehicle over the surface of the earth with regard to longitude, latitude, and altitude. Also, with the appropriate map software, the vehicle's location can then be shown on a map.

Cellular communications systems have also been added to vehicles. These communications systems enable the vehicle driver or occupant to transact telephone calls from their vehicle. Some of the more sophisticated systems are voice controlled which permit the driver to initiate or receive calls while traveling without removing a hand from the driving wheel, or diverting his/her eyes from the operation of the vehicle.

While these various electronics systems have proven useful to vehicle users, there is a drawback in that the systems are unrelated and incompatible. Each system employs separate proprietary dedicated processors or ASICs (application specific integrated circuits) which execute incompatible proprietary software. If a vehicle owner would like to add a security system to his/her vehicle, the owner must purchase an entire security system from one of the vendors and have it customarily installed. There is no way to add security functionality to an existing electronics system, such as the navigation system or the sound system.

SUMMARY

This invention concerns a vehicle computer system that is capable of integrating these diverse and separate systems as well as offering a general purpose computing platform that allows for easy expandability. The vehicle computer system has a housing sized to be mounted in a vehicle dashboard or other convenient location. This system provides an open hardware architecture and supports an open platform operating system. The open platform operating system supports multiple different applications that can be supplied by a software vendor. For instance, the operating system can support applications pertaining to entertainment, navigation, communications, security, diagnostics, and others. In the preferred implementation, the operating system is a multi-tasking operating system capable of concurrently running multiple applications. The computer has one or more storage devices (e.g., hard disk drive, CD drive, floppy disk drive, cassette player, or smart card reader) which permits the user to download programs from a storage medium (e.g., hard disk, CD, diskette, or cassette) to the computer. Also, the user can read or write data to writeable medium (e.g., hard disk, diskette, cassette, or smart card). In this manner, the vehicle owner can easily add new systems to his/her vehicle by installing additional programs.

In the described implementation, the vehicle computer system has three modules: a support module, a faceplate module, and a computer module. The support module is formed as part of a stationary base unit of the housing that resides in the vehicle dashboard or other location. It has its own logic unit which can be implemented in a field programmable gate array (FPGA), application specific integrated circuit (ASIC), customized processor, or the like. The support module also has an audio signal processor, such as a digital signal processor (DSP), which performs the signal processing for audio and video data. One could combine this DSP into the ASIC if desired.

The faceplate module is detachably connected to the support module. The faceplate module has a logic unit of its own to control an RF transceiver such as a Cell phone, a two-way pager, or a point-to-point spread spectrum transceiver, a display, a keypad, and a CODEC. The faceplate and support modules are connected using a high speed serial connection.

The computer module can be connected to or removed from the support module. The computer module and support module are interfaced using a multi-bit bus, such as a PCI bus. The computer module has a processor and runs an open platform operating system. Multiple vehicle-related applications execute on the operating system to control operation of components in the vehicle. In addition, the computer module may execute non-vehicle-related applications concurrently with the vehicle-related applications.

BRIEF DESCRIPTION OF THE DRAWINGS

The same reference numerals are used throughout the drawings to reference like components and features.

FIG. 4 shows the use of a fast data memory as a high speed data communications buffer.

DETAILED DESCRIPTION

Figure 1:
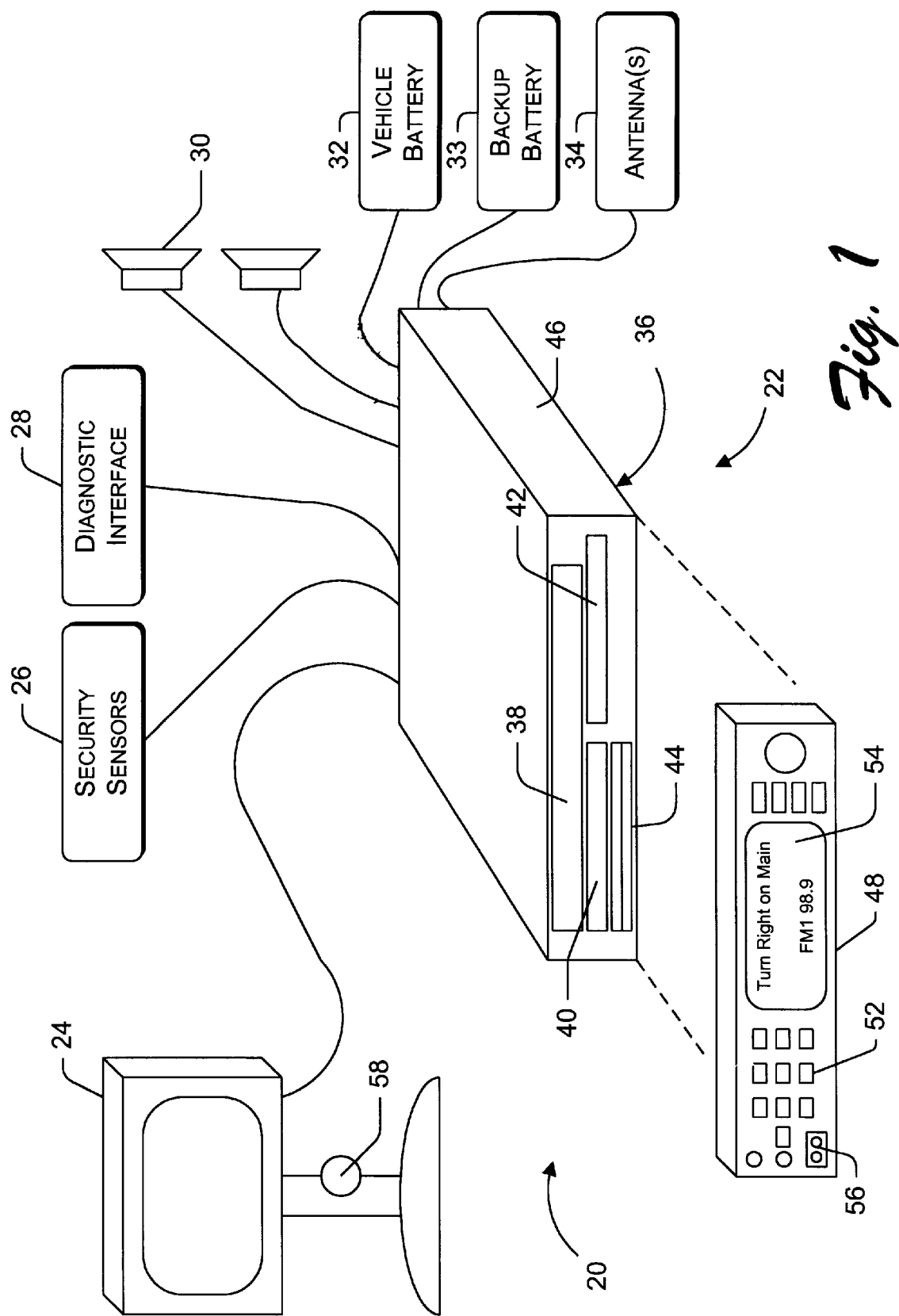
FIG. 1 is a diagrammatic illustration of a vehicle computer system.

FIG. 1 shows a vehicle computer system 20 according to one implementation of this invention. Vehicle computer system 20 has a centralized computer 22 coupled to various external peripheral devices, including a monitor 24, security sensors 26, a vehicle diagnostic interface 28, speakers 30, a vehicle battery 32, a backup battery 33, and antenna(s) 34. The computer 22 is assembled in a housing 36 that is sized to be mounted in a vehicle dashboard, similar to a conventional automobile stereo. Preferably, the housing 36 has a form factor of a single DIN (Deutsche Industry Normen). But, it possibly could be housed in a 2 DIN unit or other special form factor for an OEM.

The computer 22 runs an open platform operating system which supports multiple applications. Using an open platform operating system and an open computer system architecture, various software applications and hardware peripherals can be produced by independent vendors and subsequently installed by the vehicle user after purchase of the vehicle. This is advantageous in that the software applications do not need to be specially configured for uniquely designed embedded systems. The open hardware architecture preferably runs a multitasking operating system that employs a graphical user interface. One preferred operating system is a Windows® brand operating system sold by Microsoft Corporation, such as Windows 95® or Windows NT® or other derivative versions of Windows®. A multitasking operating system allows simultaneous execution of multiple applications.

The computer 22 includes at least one storage drive which permits the vehicle user to download programs and data from storage medium. In the illustrated implementation, the computer 22 has a CD ROM drive 38 which reads application-related CDs, as well as musical, video, game, or other types of entertainment CDs. In this manner, the CD ROM drive 38 performs a dual role of storage drive and entertainment player. The computer 22 has an optional 3.5" floppy diskette drive 40, a smart card reader 42, and dual PCMCIA card sockets 44 which accept PCMCIA card types I, II and III. Two types I or II cards can be simultaneously used, but only one card if a type III can be used. Hereinafter, the acronym "PC-Card" will be used in place of the acronym "PCMCIA." Also, a hard disk drive (not shown) can be included on the computer 22 for storing both application programs and user data. A DVD (digital video disk) player may also be included in the computer 22.

The storage drives are mounted in a base unit 46 of housing 36. The base unit 46 is constructed and sized to be mounted in the dashboard. Optionally, this base unit may be removable in the same fashion as a laptop computer and its associated docking station. This high end option allows the user to take his vehicle computer to his home or office to serve as his portable PC. The housing 36 also has a detachable faceplate 48 which is pivotally mounted to the front of the base unit 46. The faceplate can be rotated to permit easy and convenient access to the storage drives.

The computer 22 has a keypad 52 and a display 54 on the faceplate 48. The operating system executing on the computer 22 controls the faceplate peripheral, which through the faceplate processor, can control the faceplate keys 52 and the faceplate display 54 as peripheral devices when the faceplate is attached to the base unit. Additionally, the computer 22 has a voice recognition device to permit the user to verbally enter commands in a hands-free, eyes-free environment. These voice commands can be used for controlling most operating modes of the vehicle computing platform. The computer 22 is also equipped with an IrDA (infrared developers association) transceiver port 56 mounted on the faceplate 48 to transmit and receive data and programs using infrared signals. The entire faceplate unit 48 behaves as a multifunction peripheral to the computing platform.

To load an application or data onto the computer 22, the vehicle user inserts a CD or other media (if the application is not already contained on the hard disk) into the appropriate drive and the operating system downloads the application or data therefrom. The installation process can be automatically handled by the operating system, or with the assistance of commands input from the user in the form of keyed sequences on the keypad 52 or verbal instructions using the voice recognition device. Another technique to load data or applications or transfer data with other computing devices is through the use of the IrDA transceiver port 56, or the wireless Internet link 76.

The computer 22 can output visual data to the LCD 54 at the faceplate, or to the monitor 24. The display 54 is preferably a back lit LCD. The monitor 24 is preferably a small flat panel display (e.g., 6.4" screen) that is movably mounted on a stand or yoke and remotely located from the computer. The monitor 24 is fully adjustable to different viewing positions that can be seen by the driver or other passengers in the vehicle. The type of data displayed on the monitor can range widely from word instructions concerning the vehicle's performance, to diagrammatic directions used by the navigation system, to video movies for in-car entertainment. The monitor 24 is equipped with an automatic override switch 58 which automatically disables the display of any non-driving related data when positioned to be viewed by the driver. When facing the driver, only information supportive and helpful to driving (e.g., diagnostics, navigation directions) is displayed on the monitor, while distracting information (e.g., video movies, games) is blocked from display. In one implementation, the switch is an electrical cylindrical switch which closes when the display is capable of being viewed by the driver; thus, the software can sense the display position and only allow permitted information to be displayed.

In general, the vehicle computer system 20 can be used to integrate multiple vehicle-related systems onto one open platform hardware and software architecture. For instance, the vehicle computer system 20 can serve as a multimedia entertainment system, a navigation system, a communications system, a security system, and a diagnostics system. Moreover, the vehicle computer system 20 provides additional functionality traditionally associated with desk-top and laptop personal computers. For instance, vehicle computer system 20 can support word processing applications, spreadsheet applications, database applications, and appointment/schedule applications. Furthermore, the vehicle computer system 20 can be configured to operate as a server to other computing units in the vehicle to distribute games, video movies, and the like to passengers.

Figure 2:
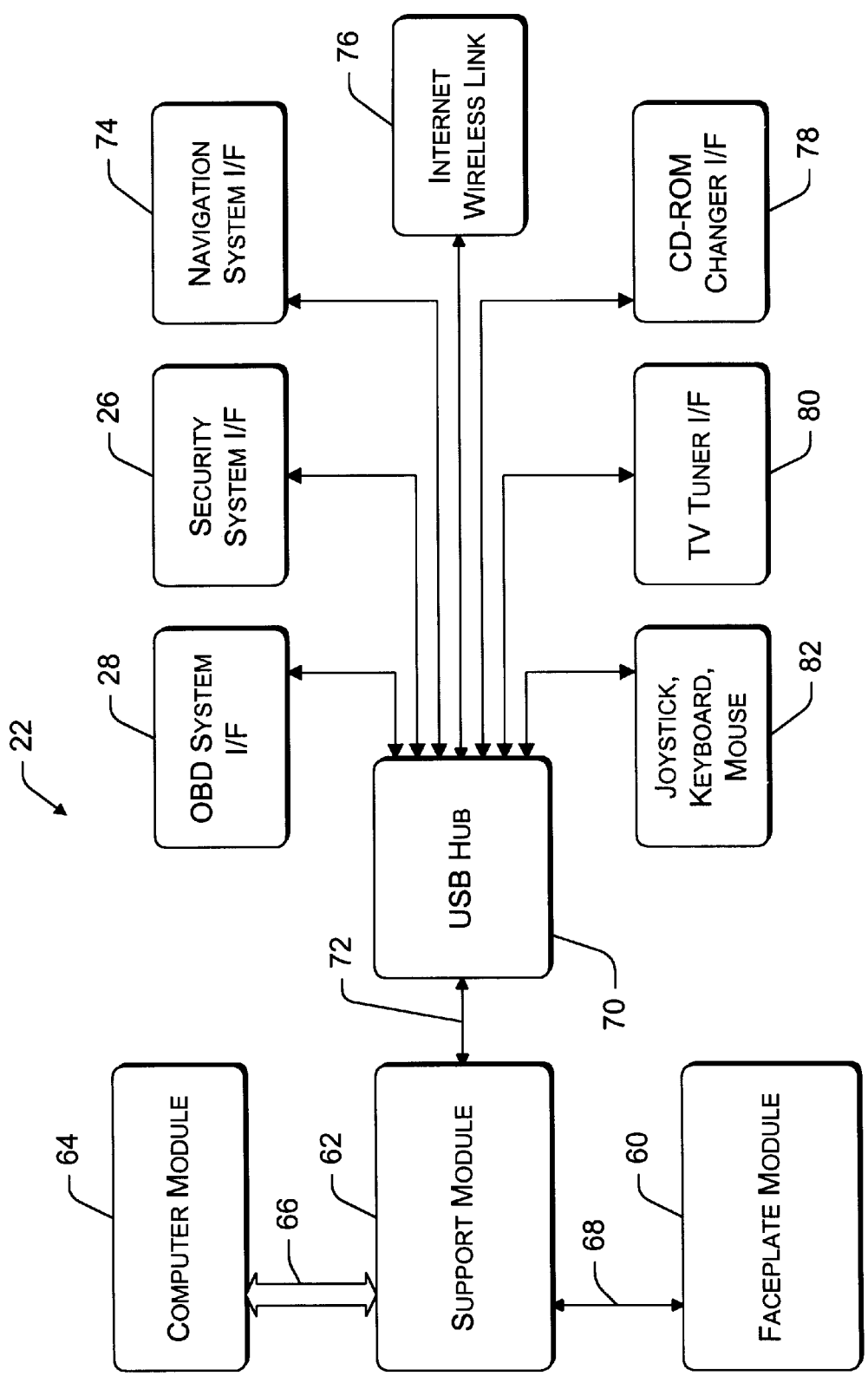
FIG. 2 is a diagrammatic illustration of the vehicle computer system interfaced with multiple external peripheral devices.

FIG. 2 shows the computer 22 according to one implementation of the invention. Computer 22 has three primary modules: a faceplate module 60, a support module 62, and a computer module 64. The computer module 64 is operatively connected to the support module 62 via a multi-bit bus 66. In the preferred implementation, the multi-bit bus is a PCI (Peripheral Component Interconnect) bus. The support module 62 and faceplate module 60 are interconnected via a high speed serial interface 68 which supports high speed, serial data communication. A preferred serial transmission scheme is described below in more detail with reference to FIG. 8.

In FIG. 2, the support module 62 is also connected to a universal serial bus (USB) hub 70 via a multi-bit connector 72 (e.g., 8 bits). The USB hub 70 provides connections to many peripheral devices (e.g., 128 devices). Example peripheral devices include the OBD (On Board Diagnostic) system 28, the security system 26, navigation system 74, a wireless link 76 to the Internet, a CD-ROM changer 78, a TV tuner 80, and user I/O devices such as a joystick, keyboard or a mouse 82. This USB hub could be separate as shown in FIG. 2 or it could be integrated into one or more of the USB peripherals.

Figure 3:
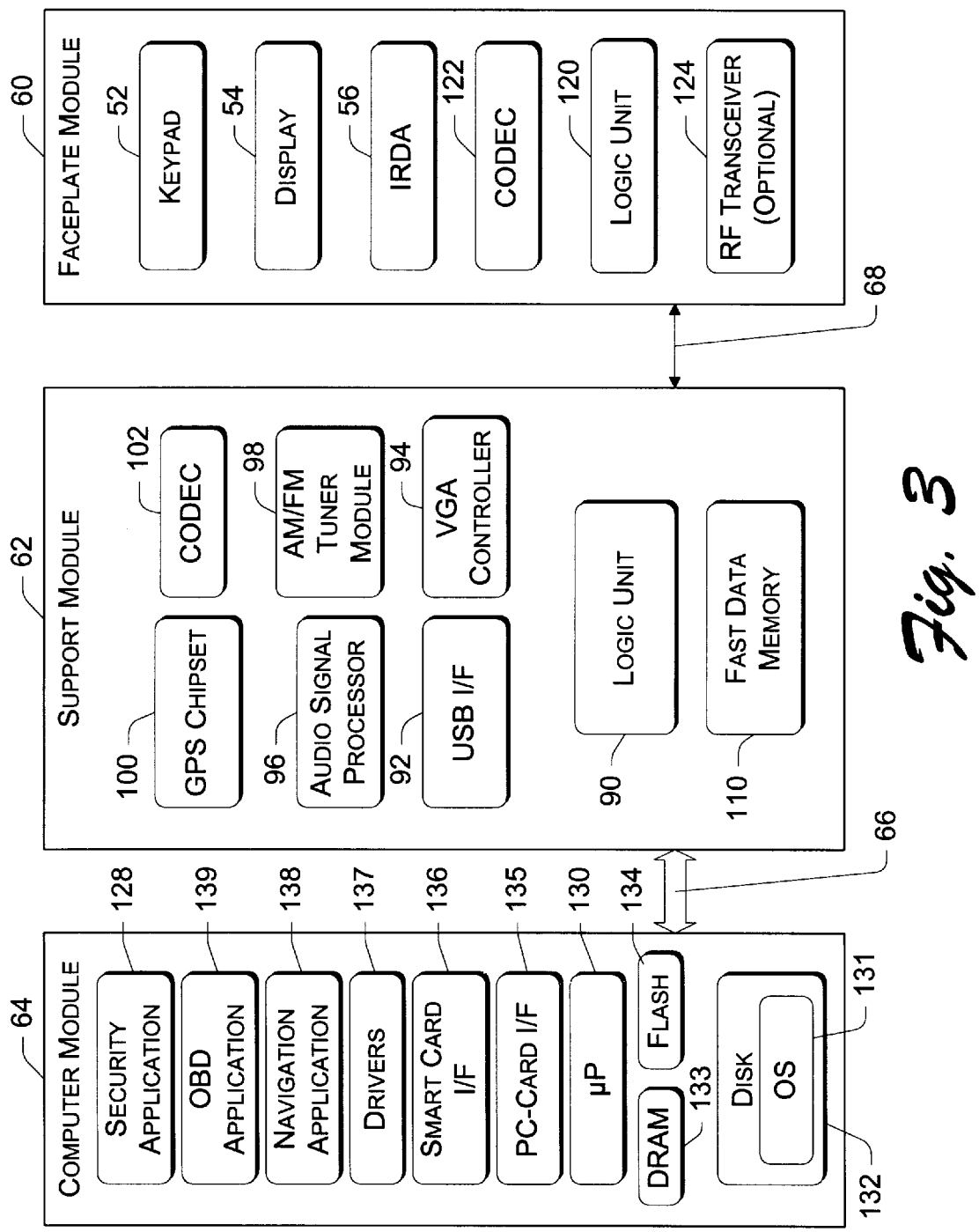
FIG. 3 is a block diagram of the vehicle computer system according to one implementation having a faceplate module, a support module, and a computer module.

FIG. 3 shows the three modules of the vehicle computer 22 in more detail. The support module 62 resides in the typically stationary base unit 46 (FIG. 1) that is mounted in the vehicle dashboard or other convenient location. The support module 62 includes a logic unit 90 which is responsible for facilitating communication among peripheral devices, establishing a master audio clock signal used throughout the vehicle computer system, and coordinating the entertainment functionality of the computer system. The logic unit 90 can be implemented as an FPGA (field programmable gate array). It is noted that the logic code for an FPGA is developed using a hardware description language, such as VHDL (IEEE standard 1076-1993), and can be recompiled for an ASIC (application specific integrated circuit) architecture. The logical unit 90 can further be implemented as a microprocessor, a RISC (reduced instruction set computing) processor, or other processing devices.

The support module 62 has several hardware interfaces. A USB interface 92 is driven from the PCI bus 66 and provides the interconnection to the various USB peripherals shown in FIG. 2. A USB hub may be required as shown if the peripherals do not incorporate one and more USB peripherals than supported directly by the support module are attached. A VGA controller 94 is provided on the support module 62 to drive the display 24 (FIG. 1). The VGA controller 94 is also driven from the PCI bus. It is noted that the USB interface and VGA controller could be incorporated into the logic unit 90. An ATAPI-IDE interface (used to drive the CD ROM or DVD player), and a PCI interface are implemented as part of the logic unit 90. For supporting higher bandwidth video applications such as multiple video screens, a P1394 interface could be added to the system and driven from the PCI interface or incorporated in logic unit 90.

The support module 62 also includes an audio signal processor 96 to perform the sound processing algorithms which may include: sound equalization, digital crossover, bass, treble, volume, surround sound, Dolby pro-logic™, AC-3 and MPEG decoding. The audio signal processor 96 also drives digital to analog converters for a six channel audio output (not shown). The audio signal processor 96 is preferably implemented as a DSP (digital signal processor), such as a Motorola DSP56009. The support module also includes an AM/FM tuner module 98, a GPS (global positioning system) chipset 100 to provide for satellite navigation such that the longitude, latitude, and altitude of the vehicle may be readily determined, and one or more audio analog to digital converters and digital to analog converters (or "CODECS") 102.

A fast data memory 110 functions as a high speed data communications buffer between the serial peripheral devices. The fast data memory is preferably implemented as a high speed SRAM (static random access memory) which provides high speed buffering and "ping-ponging" of audio data or USB data to minimize processor interaction. In the preferred implementation, the fast data memory 110 acts as a fast data memory buffer which accommodates data exchange among many devices. The fast data memory 110 is described below in more detail with reference to FIG. 6.

With continuing reference to FIG. 3, the faceplate module 60 resides on the detachable faceplate 48 (FIG. 1). The faceplate module 60 is connected to the support module through a connector that facilitates easy detachability of the faceplate 48 from the main housing 36. The faceplate module 60, through the detachable connector, communicates bi-directional data to the support module 62 by means of the high speed serial interconnect 68. The faceplate module 60 includes a logic unit 120 which can be implemented as an FPGA, ASIC, DSP, or other device. The faceplate module 60 also includes a keypad 52, a display 54, an IrDA port 56, and a CODEC 122. Additionally, the faceplate module contains a slot for an optional plug-in RF transceiver 124 such as a cellphone, two-way pager, or point-to-point spread spectrum transceiver.

Typically, the computer module 64 resides in the dashboard-mounted base unit 46 and includes a processor in the form of a microprocessor 130, such as an Intel® x86-type microprocessor. When plugged in, the computer module 64 is connected to the PCI bus 66 to communicate with the support module 62.

The microprocessor 130 runs an open platform operating system 131, such Windows 95® or Windows NT™ or other Windows® derivative operating systems from Microsoft Corporation. The operating system 131 is stored in a hard disk drive 132 (e.g. typically >200 Mbytes). This hard disk drive may be either integrated into the computer module as shown or it may be in the form of a PC-Card. The computer module 64 supports any variety of applications that the vehicle user might desire. These applications can also be stored on the hard disk drive 132 or on a removable storage medium, such as a CD ROM, cassette, PC-Card Flash memory, PC-Card hard disk drive, or floppy diskette. Additionally, user applications may be downloaded via the optional wireless Internet connection 76. A DRAM memory 133 and Flash memory (or other non volatile memory) 134 are employed in the computer module to support the microprocessor 130 in running the operating system and loaded applications.

The computer module 64 has a PC-Card interface 135 which includes a PC card socket used to support types I, II, or III PC cards (e.g., extra memory, bard disk drives, modems, RF transceivers, network adapters, or other PC-Card peripherals). The computer module 64 also has a Smart Card interface 136, which accepts Smart Cards.

The computer module 64 has a set of one or more drivers 137 including, for example, a CD ROM driver, a diskette driver, a display driver, and the like. The computer module 64 also has a navigation application 138 that includes program code for a GPS (global positioning system) receiver and program code for mapping functionality (e.g., "Automap" from Microsoft Corporation). A security system 139 is provided in the computer module 64 to manage vehicle security. The security application 114 monitors the security sensors 26 (FIG. 1) for any potential threat of theft or vandalism. The security system 146 is connected to actuators which lock/unlock doors and windows, and to an alarm which can be activated upon detection of unwanted tampering. An OBD (On Board Diagnostic) interpreter 128 is provided in the computer module to communicate with the OBD system built into the vehicle by the manufacturer. The OBD interpreter 116 interprets the status data received and provides performance related information from the vehicle's OBD system to the microprocessor 100. Also, commands can be provided to the interpreter which allows non-critical car systems to be controlled.

A more detailed explanation of the three modules in the vehicle computer system is provided in co-pending U.S. patent application Ser. No. 08/564,586 entitled "Vehicle Computer System," which was filed on Nov. 29, 1995 in the names of Richard D. Beckert, Mark M. Moeller, and William Wong. This application is assigned to Microsoft Corporation and is incorporated herein by reference.

The logic unit 90 within the support module 62 is configured with its own multi-bit bus structure that is separate from the bus of the microprocessor 130 of the computer module 64. The logic unit 90 and microprocessor 130 are interfaced using a bus, such as PCI bus 66. By configuring the logic unit 90 with its own bus, the logic unit 90 is capable of better performing its tasks independent of intervention from the microprocessor 130. Moreover, the internal bus of the logic unit 90 facilitates data communication between the audio components and other serial devices while using minimal processing resources of the microprocessor 130.

Figure 4:
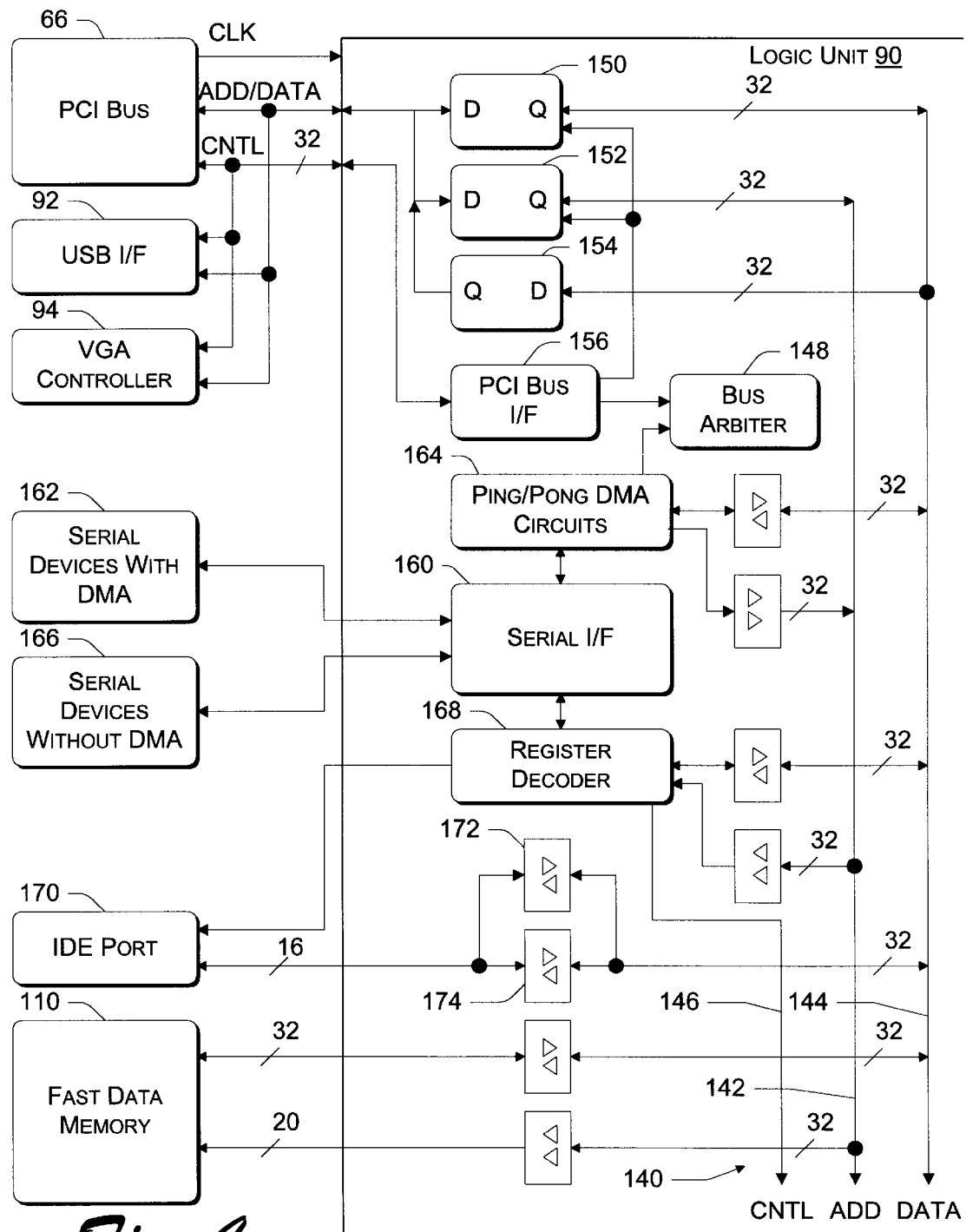
FIG. 4 is a block diagram of an interface and internal bus structure of the support module.

FIG. 4 shows a preferred implementation of an internal bus structure 140 of the logic unit 90 of the support module and the interface between the internal bus 140 and external devices. The internal multi-bit bus structure 140 includes an address bus 142, a data bus 144, and a control bus 146. In the illustrated implementation, the data bus 144 is a 32-bit bus and the address bus 142 is a sufficiently large to support in parallel at least 19 address bits, such as through a 32-bit bus. The busses are tri-state busses which are driven by one of several sources. An internal bus arbiter 148 determines which device is in control of the bus structure 140.

The PCI bus 66 connecting the support module 62 to the computer module 64 is connected to the internal bus structure 140 via latches 150, 152, and 154, and a PCI bus interface 156. The PCI connection has primary control over the internal bus structure 140. The USB interface 92 and the VGA controller 94 are devices on the PCI bus interconnect, or they may be incorporated into the logic unit 90.

Serial devices are connected to the internal bus structure 140 via a serial interface 160. Some of the peripheral devices are implemented to write data directly to the fast data memory 10 use a direct memory access (DMA) process (described below). Such serial devices are referenced by number 162. Example of DMA-configured peripheral devices include the audio signal processor 94, the faceplate module 60 (which is treated as a multifunction peripheral when attached to the support module), the AM/FM tuner 98, etc. From the perspective of the logic unit, these serial devices behave with respect to the DMA process as any peripheral device. Accordingly, in this context, the serial devices internal to the support module may be referred to as "serial devices," "serial peripheral devices," or simply "peripheral devices."

The data from the serial devices 162 are received at the serial interface 160 and transferred to ping/pong DMA circuits 164. The DMA circuits 164 include a serial to parallel converter to convert the data to a parallel format. The parallel data is transferred from the ping/pong DMA circuits 164 over the bus structure 140 to the fast data memory 110. An example ping/pong DMA circuits 164 is described in more detail below with reference to FIG. 5.

Other peripheral devices, referenced by number 166, are not linked to DMA circuitry because of their low bandwidth requirements. An example of this peripheral device is the navigation GPS chipset 100. Serial data from a peripheral device 166 is received at the serial interface 160 and stored in a parallel format in an internal register where it may be read by the computer module 64.

The logic unit 90 supports an IDE (Integrated Device Eletronics) port 170 for connection to the CD ROM or other IDE compatible device, such as a DVD player or IDE hard disk drive. The CD ROM is an IDE device with an ATAPI software interface, and typically has a 16-bit bus. The IDE port 170 is accessible from the bus structure 140 through two 16-bit bi-directional buffers 172 and 174 to translate the 16-bit CD-ROM data to the proper word location in the 32-bit internal data bus 144. The microprocessor in the computer module communicates to the CD ROM through a sequence of ATAPI commands written to registers decoded by the logic unit. The register decoder 168 decodes and transfers read/write timing signals to IDE port 170 for output to the IDE compatible device.

Memory locations within the fast data memory 110, the I/O ports to the peripheral devices 162, 166, and the IDE port 170 can be mapped into the address space presented by the logic unit 90. Data can be sent to the peripheral devices or memory 110 over the internal address/data bus 140 by using addresses which have been uniquely assigned to each peripheral device or memory block. In a preferred implementation, the memory 110 is a 32-bits wide SRAM with four byte enable lines to allow for combinations of byte, word, or double word access. The fast data memory address and data lines are driven by the logic unit 90 from the internal address/data bus structure 140 and the fast data memory will be enabled when the address is in the range mapped to the multiport memory 110. The address/data bus structure 140 will also be driven for transfers between the host processor and peripheral registers such as the computer module reading the GPS receive registers.

The internal address/data bus 140 splits its time between requests from the PCI bus 66 and DMA requests for accessing the memory 110. The bus arbiter 148 controls the bus ownership and has selection logic to transition between a PCI bus request and a DMA request. The bus arbiter circuit 148 generally tries to grant one-half of the bus bandwidth to the PCI bus 66 and one-half to the DMA processes. When the arbiter decodes an active request, it initiates a bus cycle state machine and the active request grants the bus to either the PCI bus or to one of the internal DMA circuits.

As noted above, signals received from the PCI bus 66 have priority on the address/data bus 140. The PCI bus signals are input into the logic unit 90 as 32-bit multiplexed signals consisting of address/data bits plus the PCI control/timing signals. When a PCI bus cycle begins, the logic unit 90 decodes the address. If the address corresponds to a mapped I/O port in or controlled by logic unit 90 or to a memory location within fast data memory 110, the logic unit 90 drives a device select signal back to the PCI master at the computer module 64, which in turn sets a PCI BUS REQUEST bit inside the logic unit 90. The bus arbiter 148 grants the PCI bus 66 access to the internal address/data bus 140 at the next opportunity.

While this is happening the PCI bus is held in a wait state until the logic unit 90 asserts a target ready signal. The bus arbiter 148 grants the PCI bus interface circuit 156 access to the internal bus when the PCI BUS GRANT signal is active. This initiates a bus cycle state machine in the logic unit, which generates an internal read or write bus cycle. If the logic unit starts a write cycle, it waits for an initiator ready signal from the PCI bus to indicate that the write data is valid. For a read cycle, the internal bus cycle completes and the data is latched in the output data latch 154 of the PCI interface circuit. The logic unit 90 then asserts the target ready signal to allow the PCI master of the PCI bus 66 to complete the bus cycle.

When the PCI bus cycle is not mapped to an I/O port or to a memory location in memory 110, the PCI bus interface 156 in the logic unit keeps the internal address and data bus isolated from the PCI bus 66. In this manner, the PCI bus 66 and the internal bus structure 140 of the logic unit 90 can both be executing independent bus cycles. As a result, the data/address bus 140 of the logic unit 90 can service DMA bus operations occurring between the various serial devices 162 and the memory 110 without impacting the bandwidth of the PCI bus 66 or the microprocessor in the computer module 64.

One aspect of this design is the way in which multiple peripheral devices 162 communicate through shared memory buffers in the fast static memory 110. Many serial devices can be receiving data and buffering the data in the fast data memory 110 without intervention from the microprocessor on the computer module. The internal address/data bus structure 140 of the logic units, combined with the ping/pong DMA circuits 164, form an effective communications buffer for handling the data communications between the serial devices, thereby significantly reducing the processor overhead in handling numerous data streams.

In the preferred implementation, there is one ping/pong DMA circuit for each corresponding DMA-configured serial peripheral device 162. Recall from above that the fast data memory 110 has partitioned memory space that is mapped to corresponding ones of the peripheral devices. In this manner, storage areas within the memory 110 correspond to different peripheral devices. The ping/pong DMA circuit designates through memory pointers particular storage areas of the fast data memory 110 that belong to its associated peripheral device.

Figure 5:
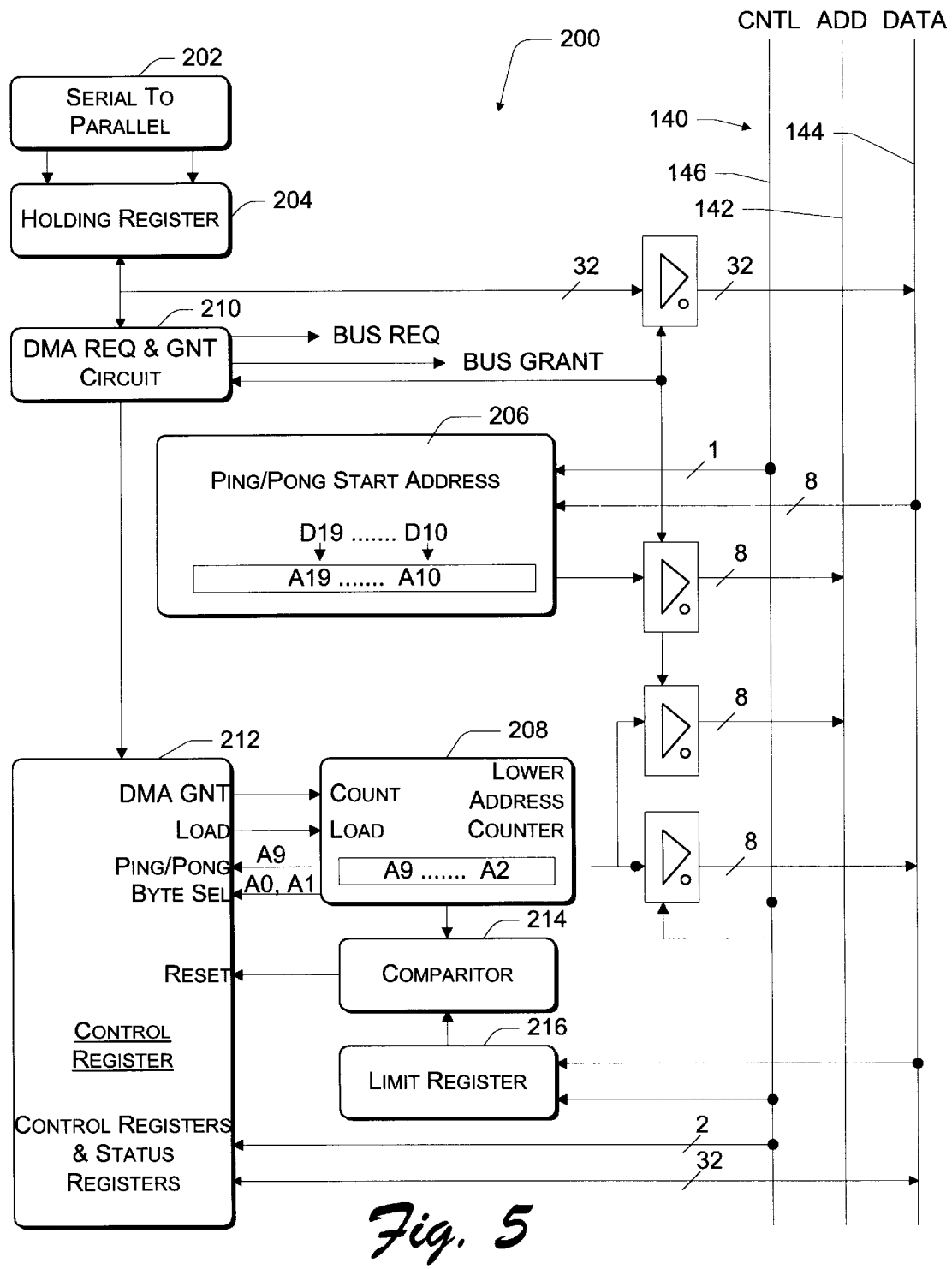
FIG. 5 is a block diagram of a memory access circuit which maps data from peripheral devices into storage locations within the fast data memory.

FIG. 5 shows a ping/pong DMA circuit 200 in more detail. The DMA circuit 200 has a serial-to-parallel converter 202 to convert the serial data received from the associated peripheral device into a parallel format for transfer on the internal bus 140. The parallel data is placed initially in a holding register 204.

A start address register 206 is provided to locate the appropriate buffer area within the fast data memory to hold the data in the holding register 204. The logic unit initializes a DMA process by writing a word to the start address register 206. The word defines the beginning of the buffer area in the fast data memory 110. The upper bits of the start address register 206 represent the upper address lines of a buffer pointer into the memory 110. In this implementation, the lower address bits in the start address register 206 are not used. The start address of the buffer area is on a page boundary and the size of the buffer area is a pre-determined size corresponding to the page size.

A lower address counter 208 is used to access the specific location within the designated buffer area of the memory. The number of bits in counter 208 corresponds to the size of the buffer area. In this implementation, the counter employs ten address bits A0–A9. A count output by the counter 208 is used as a pointer to the specific location into which the data in the holding register 204 is to be stored. Once the data is transferred to the storage location, the counter is incremented to reference the next appropriate location.

Each ping/pong DMA circuit defines two buffers within the buffer area of the memory 110: a "ping" buffer and a "pong" buffer. The ping buffer represents a portion of the buffer area for a particular device into which data is being written from that device. Conversely, the pong buffer represents another portion of the buffer area from which data is being read. The upper address bit A9 of the counter 208 divides the buffer area into the ping and the pong buffers. When a transition of the upper counter bit occurs an interrupt may be generated, if the corresponding interrupt mask is enabled.

Address bits A0 and A1 are used to generate the four byte select signals of the internal address/data bus 140. The lower two bits A0 and A1 of the counter 208 are used to select one of the byte select lines if the transfer is byte wide. The lower bit A1 is used to select an upper pair or lower pair of the byte select lines if the transfer is word wide. All byte enables are active for double word transfers. In this manner, the DMA process accommodates byte, word, or double word size data packets. As an example, a DMA circuit for an I$^2$C bus™ compatible peripheral device is configured for byte size data packets (i.e., 8 bits) because data is received from an I$^2$C bus™ in byte sizes. CD-ROM data is transferred in word sizes (i.e., 16 bits) which is appropriate for its bus size. I$^2$S digital audio data is transferred on a double word size (i.e., 32 bits).

In the case of a serial receive process, a serial data stream received from a peripheral device is shifted within the serial-to-parallel converter 202 to form units of 8, 16, or 32 bits in length. After the appropriate number of shifts, the data is transferred to register 204. This transfer causes the DMA REQ & GNT circuit 210 to set a Bus Request signal.

The bus arbiter circuit 148 (FIG. 4) looks at the bus request and grants the bus 140 to the DMA request at the next opportunity. Initiating a bus grant signal signifies that the bus has been granted to the DMA process. The bus grant signal enables the upper address bits A10–A19 in the start address register 206 and the lower address bits A2–A9 in the counter 208 to drive the internal address bus 142 for locating the appropriate address space in the fast data memory buffer. The appropriate byte enable lines are also driven. The data is transferred from the holding register 204 onto the data bus 144 and written into the fast data memory 110 at the address on the address bus 142. The counter 208 is then incremented by one byte, word, or double word to prepare for the next address space of the buffer.

The logic unit can clear the counter 208 or inhibit the request signal by writing to a control register 212.

In the illustrated implementation, a limit register 216 is used to set a limit value which may be less than that of the full size of the ping/pong buffer. For most cases, the limit value is set equal to the buffer size. In some cases, however, the buffer size might need to be smaller to handle odd size data blocks, such as data from the CD-ROM or other certain USB peripheral devices. The comparator 214 compares the pointer moving through the buffer with the limit value stored in register 216. When the counter 208 reaches the limit value in register 216, the counter is reset and starts again. As a result, the size of the ping/pong buffer is not restricted to some capacity based on a power of two. The comparitor and limit register enable the buffer to accommodate irregular data block sizes.

The serial transmission case in which data is read out of the memory buffer is similar in the way of seizing control of the internal address bus and moving data out of the memory and onto the bus. In the transmission case, the Bus Request signal is activated when the data contents of the holding register 204 are transferred to the converter 202 for output, thereby leaving the holding register empty and awaiting the next data unit.

The direct memory access configuration of the logic unit 90, memory 110, and DMA circuits 200 enable fast and effective handling of the data communication to and from the serial peripheral devices. It permits the logic unit 90 to support many different serial peripheral devices without burdening the computer module. Another advantage is that the logic unit 90 enables efficient use of the memory space through the use of an "overlay" technique.

Figure 6:
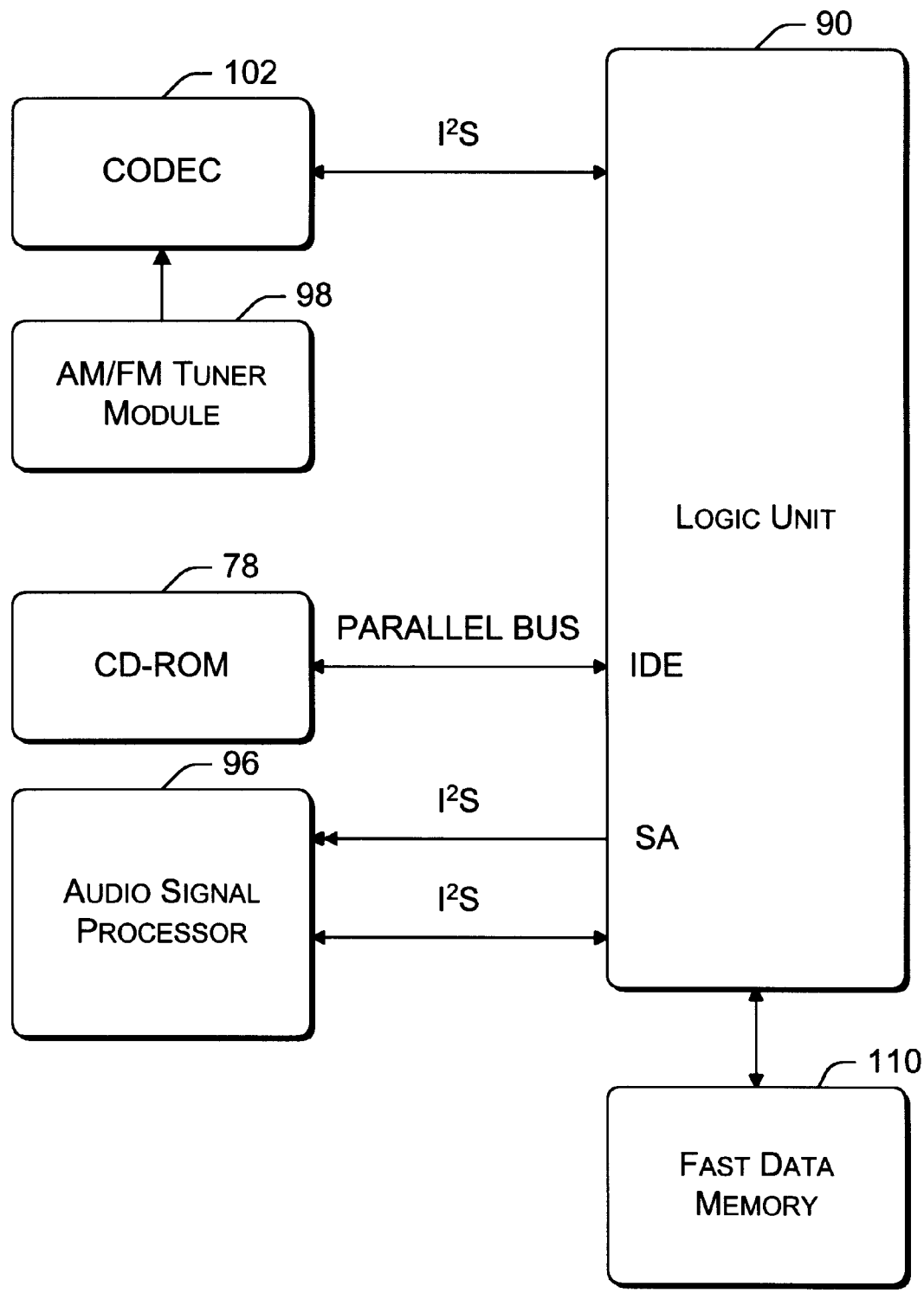
FIG. 6 is a block diagram of the support module which is used to illustrate audio data exchange among multiple serial devices through the fast data memory.

To illustrate an efficient memory overlay technique, FIG. 6 shows a simplified block diagram of the logic unit 90 coupled to various peripheral devices including, for example, the CD-ROM 78, audio signal processor 96, and AM/FM tuner 98 via CODEC 102. A sound source can be linked to the digital audio signal processor 96 by overlaying the ping/pong buffer area in the fast data memory 110 designated for the sound source with the ping/pong buffer area designated for the audio signal processor 96. In this manner, the buffer area for the sound source has the same beginning and end points as the buffer area for the audio signal processor. This overlay allows the two devices to share the same buffer to efficiently exchange data. The sound source fills up its corresponding ping buffer area which happens to be the pong buffer for the audio signal processor. Concurrently, the audio signal processor is reading out of its ping buffer (i.e., the sound source's pong buffer) to retrieve data just filled by the sound source. When the sound source fills its ping buffer and the audio processor finishes reading its ping buffer, the sound source begins writing data to its corresponding pong buffer and the audio processor begins reading from its pong buffer which was just filled by the sound source.

Whenever a DMA process crosses a ping or pong boundary, an interrupt is generated, if unmasked. This is true for both the DMA process of the audio source and for the DMA process for an output to the signal processor. The interrupts may be used by software to guarantee that the two DMA processes stay synchronized.

The DMA overlaying process is further demonstrated by the following examples in which memory buffers designated for different data sources are overlaid on the memory buffers designated for the signal processor. These examples are described with reference to FIGS. 4–6.

Suppose the AM/FM tuner 98 is the source of the audio data. The AM/FM tuner 98 produces audio data which is digitized into a serial data stream in the a CODEC. The DMA circuit 200 corresponding to the AM/FM tuner 98 receives the serial stream, converts it to a parallel format, and requests permission to write the data over the internal data bus 144 to the buffer pointed to by the ping/pong start address register 206. More particularly, the data is written to a location within the buffer referenced by the counter 208. For discussion purposes, suppose that the upper bit A9 is "0" to designate that the data is written to "ping" buffer.

Concurrently, the DMA circuit 200 corresponding to the audio signal processor 96 maintains an address in its register 206 which references the same buffer area of the memory 110 used by the AM/FM tuner 98. However, the upper counter bit A9 of its counter 208 has a binary "1" to reference the "pong" buffer of the signal processor space. While data from the AM/FM tuner 98 is written to its ping buffer (also the audio signal processor's ping buffer), the signal processor is reading data from its pong buffer (also the tuner's pong buffer). Both of these events are based on a master clock signal so that the toggle between the ping and pong buffers for both the tuner and signal processor occur simultaneously in both incoming and outgoing data. The interrupts generated by both incoming and outgoing toggles can be ignored, unless the logic unit 90 has some interest in the data.

Accordingly, the architecture promotes efficient data transfer from the AM/FM tuner to the signal processor without burdening the processing resources of the computer module or the logic unit.

As another example, suppose the CD ROM 78 is the source of the data. The DMA circuits associated with the CD ROM 78 and the audio signal processor 96 are configured to point to the same buffer area of the fast data memory 110 buffer, with the ping buffer of each overlapping with the pong buffer of the other. In this case, the logic unit 90 interfaces with the CD ROM 78 through the IDE port, but the overlay aspects are essentially the same. The CD ROM alternately fills its associated ping and pong buffer spaces within the fast data memory 110 while the audio processor concurrently reads from its associated ping and pong buffers to extract the audio data just written by the CD ROM.

The logic unit facilitates similar data flow between the signal processor and other serial devices, including the CODEC, the USB hub which connects to many outside peripheral devices, the computer module via the PCI bus, and so forth.

Figure 7:
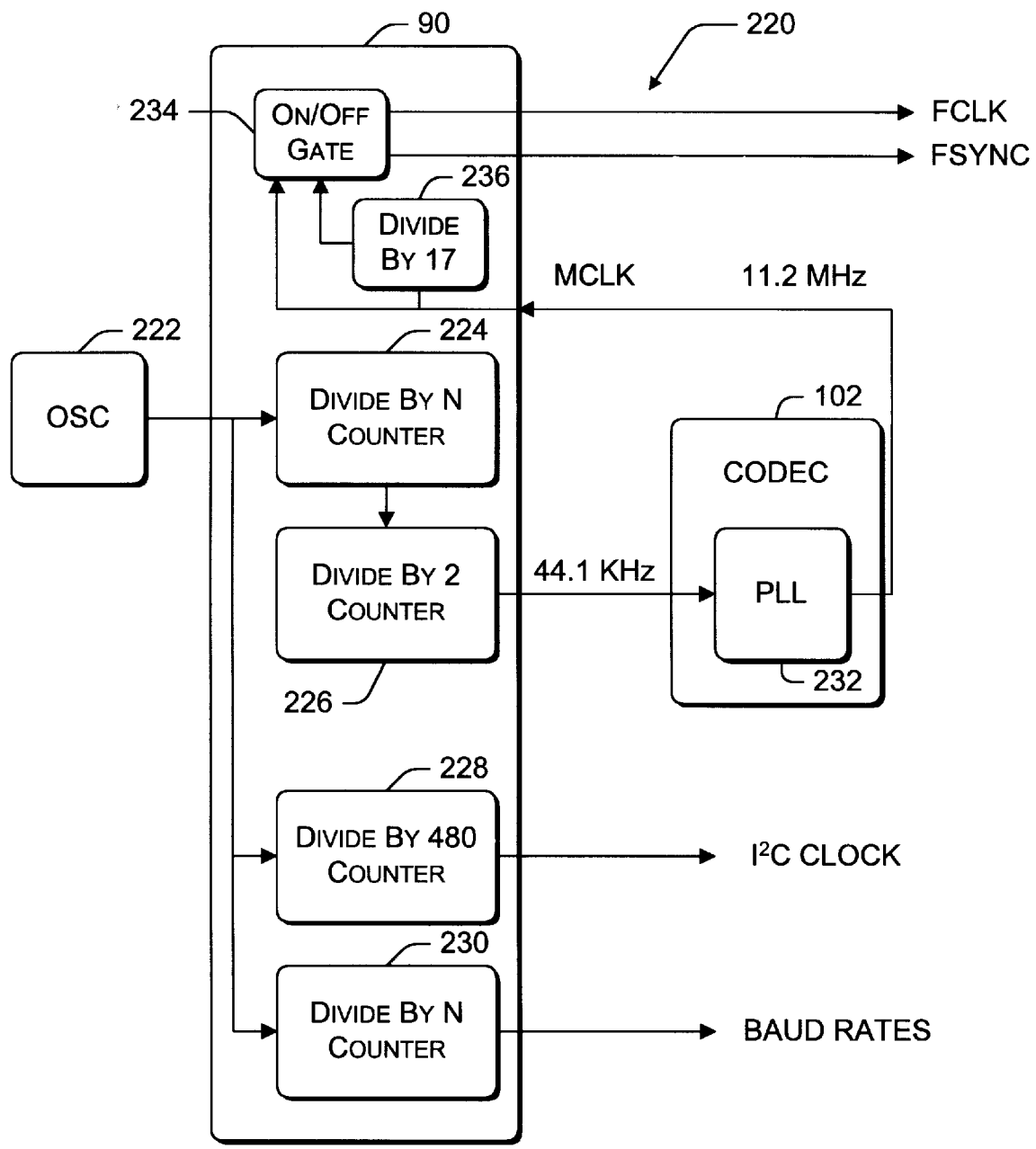
FIG. 7 is a functional block diagram of a master clock generating unit which produces a master audio clock signal used throughout the vehicle computer system.

FIG. 7 shows a master audio clock generating unit 220 that is resident in the support module 62. The master clock generating unit provides clock signals to many components and interfacing busses. The master clock generating unit 220 includes a clock oscillator 222 which, in the preferred implementation, is a 48 MHz oscillator. A divide-by-N counter 224 and a divide-by-two counter 226 are formed as part of the logic unit 90 to produce a master audio clock signal used to synchronize the various audio components in the vehicle computer system. Assuming a 48 MHz oscillator, the counters 224 and 226 produce an audio clock signal of approximately 44.1 KHz. The clock generating unit 220 also includes a divide-by-480 counter 228 to produce a 100 KHz I²C bus™ clock signal, and a divide-by-N counter circuit 230 which produces various baud rates for UARTs.

The master clock generating unit 220 employs a phased lock loop (PLL) 232 of the CODEC 102 which multiplies the audio clock signal to yield a high speed clock signal that can be transmitted over the high speed serial interface 68 to the faceplate module. In the illustrated implementation, for example, the PLL 232 multiplies the 44.1 KHz signal by a factor 256 to produce a high speed clock signal of approximately 11.2 MHz. This high speed clock signal is passed back through the logic unit 90 where it is passed through an on/off gate 234 to be selectively output to the faceplate module as the faceplate clock FCLK signal when the faceplate is attached. Additionally, the logic unit 90 has a divide-by-17 counter 236 which generates a synchronizing bit FSYNC every $17^{th}$ bit of the high speed clock signal. The faceplate module is equipped with a clock generation circuit which divides the high speed clock signal back down to the desired audio rate of 44.1 KHz. If the faceplate module is detached from the support module, the logic unit 90 disables the FCLK signal to conserve power.

One benefit of the master clock generating unit 220 is that it can adjust and fine tune the clock frequency to accommodate fixed rate audio devices, such as a CD ROM player. Such devices often have a fixed rate that might vary slightly from the specified optimal clock frequency. To ensure an optimum synchronization among the audio components, the master clock generating unit 220 adjusts itself by altering the value N in the divide-by-N counter 224 to thereby produce slightly different audio clock rates that approximate the desired 44.1 KHz. This master clock adjustability feature provides better synchronization which in turn promotes optimal sound quality.

Data is carried over the high speed serial interconnect between the support and faceplate modules using the 11.2 MHz clock rate. The data is transferred as a synchronized serial bit stream which is organized into multiple frames. Each frame has multiple data bits and at least one valid bit to indicate whether the data bits are valid. The frames are set apart from one another by a synchronization signal.

Figure 8:
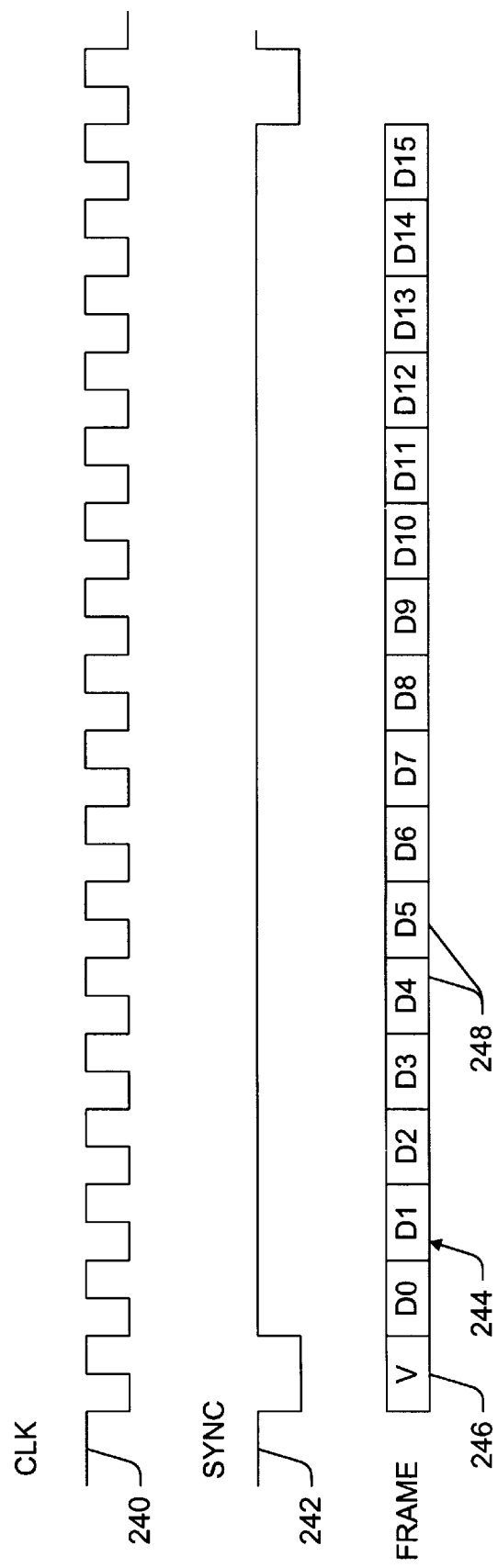
FIG. 8 is a timing diagram illustrating a serial bit stream used to communicate data between the support and faceplate modules.

FIG. 8 shows a timing diagram of the high speed clock 240, a synchronization signal 242, and one data frame 244 according to a preferred implementation. The clock signal 240 is produced at a frequency of approximately 11.2 MHz. The synchronization signal 242 is asserted every $17^{th}$ clock pulse and remains asserted through one clock period. Following this synchronization bit, a 17-bit frame is transferred. The frame includes a valid bit 246 and 16 bits of data D0–D15. The valid bit 246 is set when the data bits 248 are valid and reset wen the accompanying data bits are not valid.

Figure 9:
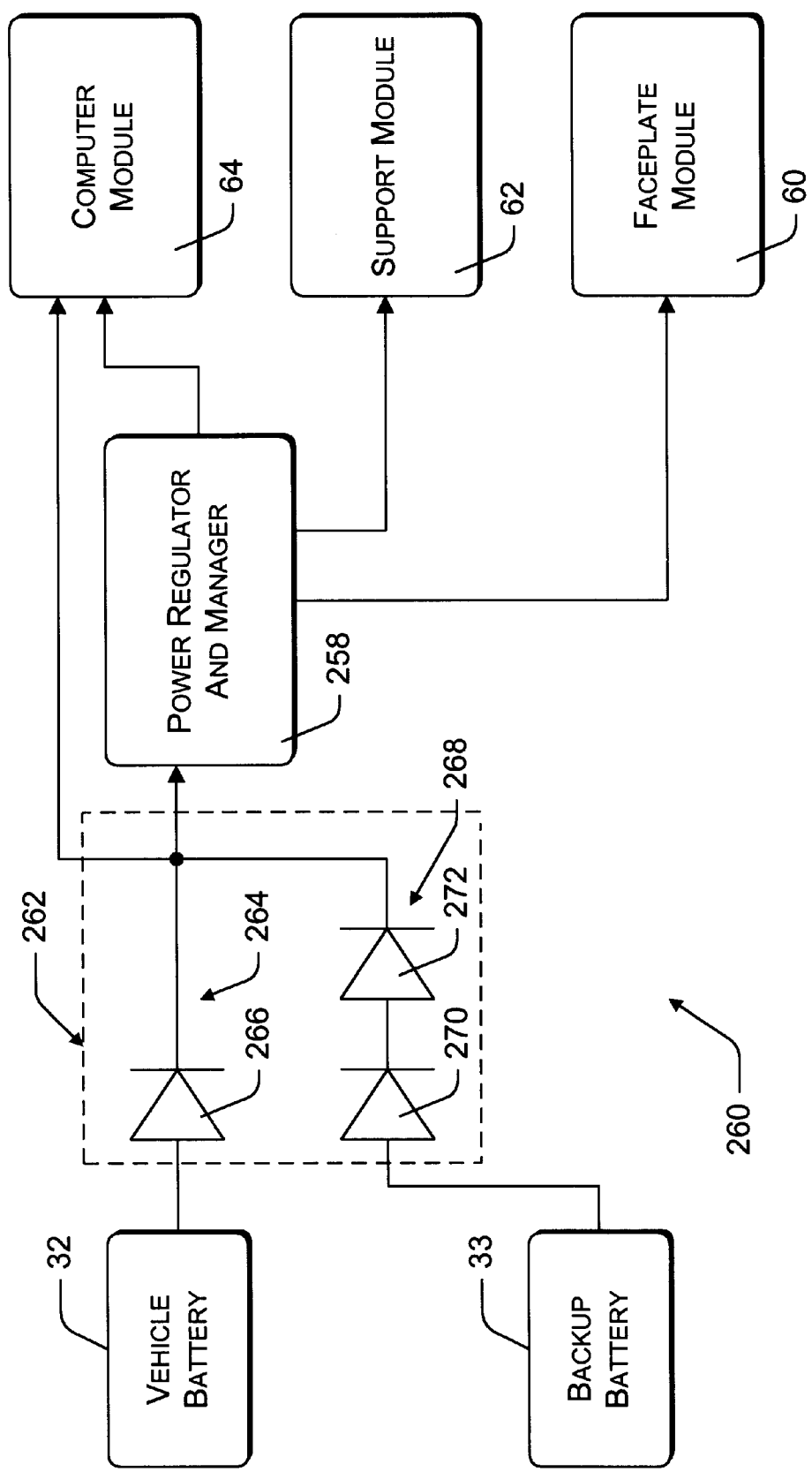
FIG. 9 is a block diagram of a power system employed by the vehicle computer system.

FIG. 9 shows a power system 260 for the vehicle computer system. The power system 260 is designed to ensure that the vehicle computer system has power in the event that the primary vehicle battery 32 is disconnected, becomes discharged, or during engine starting. For instance, the vehicle battery 32 may be rendered ineffective if the user accidentally leaves on the vehicle lights, or if a person attempts to disarm the vehicle by disconnecting the battery. It is desirable that the computer system remain operative to maintain security and communication features even though the system can no longer draw power from the vehicle battery. Another concern is that the voltage output of the vehicle battery 32 can be reduced to less than five volts when the vehicle is being started. This brief low voltage period may adversely affect operation of the vehicle computer system.

To alleviate these potential problems, the power system 260 has a backup battery 33 which functions as a secondary power source to the vehicle computer system. The backup battery 33 can be identical to the primary battery or something with less, but sufficient power to support a computer system. The power system 260 also includes a power source selector 262 coupled between (1) both the primary and secondary power sources 32, 33 and (2) the vehicle computer system. The power source selector 262 alternately enables the primary battery 32 or the backup battery 33 to supply power to the vehicle computer system. The power is input to a power regulator and manager 258, which converts the power to the appropriate levels for use in the computer module 64, the support module 62, and the faceplate module 60.

In the illustrated implementation, the power source selector 262 is configured using solid state electronic devices in the form of diodes that do not require any switching or relay circuitry. The selector 262 includes a first diode path 264 having n diodes (n=1, 2, . . . ), as represented by diode 266, connected between the vehicle battery 32 and the vehicle computer system. The selector 262 also includes a second diode path 268 having at least n+1 diodes, as represented by two diodes 270 and 272, connected between the backup battery 33 and the vehicle computer system. By placing at least one more diode in the backup-to-computer path 268, the vehicle computer system will draw voltage primarily from the vehicle battery 32 during normal operation because there is less voltage drop in the primary-to-computer path 264 so long as the vehicle battery 32 has sufficient power.

In the event that the vehicle battery 32 becomes discharged to point below the voltage level of the backup battery (plus a voltage drop for the additional diode(s) in the second path 268), the computer system draws voltage from the backup battery 33. The diode 266 prevents current from going back into the dead or discharged battery 32 to efficiently divert the power to the vehicle computer system.

The backup battery 33 has its own charging circuit (not shown) which enables it to be charged when the vehicle is operating. For instance, in an automobile, the charging circuit allows the automobile's alternator to charge the backup battery 33.

The power regulator and manager 258 provides four main power states during operation of the vehicle computer system. These states include power up, intermediate power, power down, and power off. In the "power up" state, all components in the computer system are fully powered up. In the "intermediate power" state, some of the components are powered up, while others of the components and peripheral devices are powered down. The "power down" state is the lowest power state without removing power altogether. The busses and logic unit are on, but most components and peripherals are powered down. User activation can bring the system back from the power down state to a power up state. In the "power off" state, all components are off, excepting a few wake-up circuits, battery-backed clock, and the like.

Figure 10:
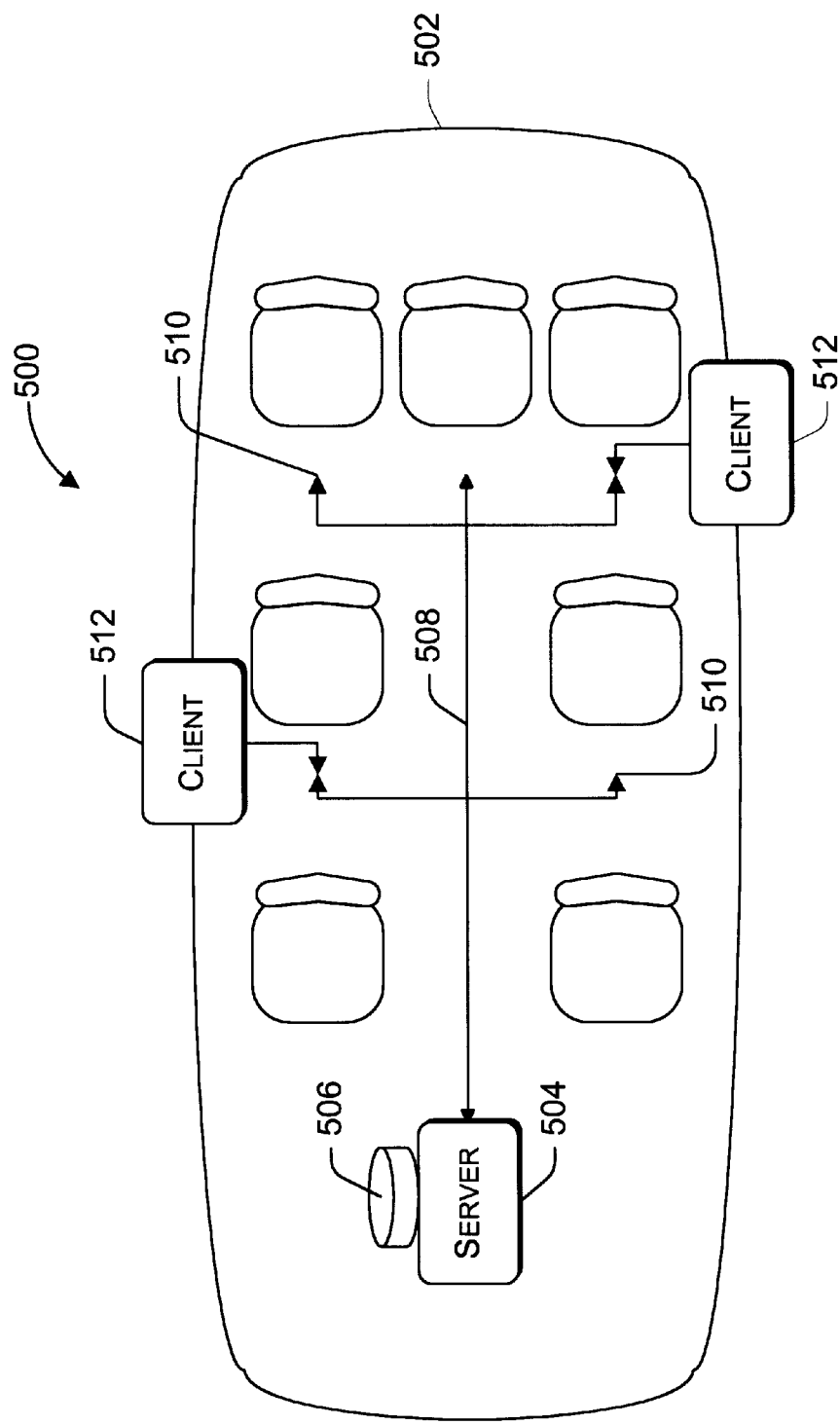
FIG. 10 is a diagrammatic illustration of the vehicle computer system according to another embodiment having a centralized server computing unit and one or more client computing units distributed on a data network in a vehicle.

FIG. 10 shows a vehicle computer network system 500 designed for a vehicle 502. In this example illustration, the vehicle 502 is a minivan or sport utility vehicle which seats seven occupants. The system 500 has a server computing unit 504 which is mounted in a first location of the vehicle 502. Preferably, this server computing unit 504 is implemented as computer 22 described above and mounted in the vehicle dashboard or other suitable location. The server computing unit 504 runs a server operating system, such as Windows NT®.

A mass storage device or database 506 is provided at the server computing unit 504 to store data. In one implementation, the storage device 506 comprises data and programs stored on a CD that can be read using the CD ROM drive of the server computing unit. Alternatively, the storage device 504 can be implemented as a hard disk drive or a tape storage.

A data network 508 is arranged throughout the vehicle 502 to provide connection ports at various locations remote from the server computing unit 504. Here, connection ports 510 are provided at each of the rear five passenger seats.

The vehicle computer network system 500 has one or more client processing units 512 equipped with a compatible interface adapter for the network connection port 510. Once connected to the network, the client processing unit 512 can receive data and programs from the central storage device 506 via server computing unit 504. The client processing unit 512 preferably has a visual display screen and audio sound card to provide multimedia entertainment.

According to this arrangement, the server computing unit 504 can provide in-car entertainment to passengers. For instance, a movie can be shown to a passenger by inserting a video disk into the CD ROM drive 506 at the server computing unit 504. The central computing unit becomes a video server distributing video over the data network 508 to the client processing units 512. Other types of entertainment include games and music.

The network system can be configured to be interactive in which the client computing units 512 can request certain entertainment from the server computing unit 504. For example, suppose a game CD having multiple games is loaded in the CD ROM drive. One passenger wants to play an combat video game, while another passenger wishes to play computer chess. Each client computing unit can request the appropriate game from the server computing unit 504, which retrieves the games and distributes them to the requesting client computing units.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A vehicle computer system comprising:
   a housing of a size suitable to be mounted in a vehicle dashboard;
   a computer mounted within the housing;
   an open platform operating system executing on the computer; and
   multiple vehicle-related applications executing on the operating system to control operation of components in the vehicle.

2. A vehicle computer system as recited in claim 1 wherein the housing has a form factor of a single DIN.

3. A vehicle computer system as recited in claim 1 wherein the vehicle-related applications are selected from a group comprising a navigational application, a communications application, a vehicle security application, and a vehicle diagnostics application.

4. A vehicle computer system as recited in claim 1 further comprising one or more non-vehicle-related applications executing on the operating system.

5. A vehicle computer system as recited in claim 4 wherein the non-vehicle-related applications are selected from a group comprising an entertainment application, a word processing application, a spreadsheet application, a database application, and an appointment/schedule application.

6. A vehicle computer system as recited in claim 1 further comprising a storage drive to load individual applications from a storage medium onto the computer.

7. A vehicle computer system as recited in claim 1 further comprising an Internet wireless link to download individual applications to the computer.

8. A computer network system for an automobile, comprising:
   a network;
   at least one client computing device connected to the network; and
   a vehicle computer connected to the network to serve content to the client computing device, the vehicle computer having a housing of a size suitable to be mounted in a vehicle dashboard, a computer mounted within the housing, an open platform operating system executing on the computer, and multiple vehicle-related applications executing on the operating system to control operation of components in the automobile.

9. A vehicle computer system comprising:
   a support module having a bus;
   a computer module connected to the bus, the computer module having a processor;
   a faceplate module connected to the bus;
   multiple applications stored on the computer module and executed by the processor.

10. A vehicle computer system as recited in claim 9 wherein the applications comprise vehicle-related applications.

11. A vehicle computer system as recited in claim 9 wherein the applications comprise both vehicle-related applications and non-vehicle-related applications.

12. A vehicle computer system as recited in claim 9 further comprising a multitasking operating system stored and executed on the computer module.

13. A vehicle computer system as recited in claim 9 wherein the applications are selected from a group comprising a navigational application, an entertainment application, a communications application, a vehicle security application, a vehicle diagnostics application, a word processing application, a spreadsheet application, a database application, and an appointment/schedule application.

14. A vehicle computer system as recited in claim 9 wherein the support module has a form factor of a single DIN.

15. A computer network system for an automobile, comprising:
   a network;
   at least one client computing device connected to the network; and
   a vehicle computer connected to the network to serve content to the client computing device, the vehicle computer having a support module having a bus; a computer module connected to the bus, the computer module having a processor; a faceplate module connected to the bus; and multiple applications stored on the computer module and executed by the processor.

16. A vehicle computer system comprising:
   a computer;
   an open platform operating system executing on the computer; and
   multiple applications executing on the operating system, the multiple applications including at least one vehicle-related application and at least one non-vehicle related application.

17. A vehicle computer system as recited in claim 16 further comprising a storage drive to load individual applications from a storage medium onto the computer.

18. A vehicle computer system as recited in claim 16 further comprising an Internet wireless link to download individual applications to the computer.

19. A vehicle computer system as recited in claim 16 wherein the applications are selected from a group comprising a navigational application, an entertainment application, a communications application, a vehicle security application, a vehicle diagnostics application, a word processing application, a spreadsheet application, a database application, and an appointment/schedule application.

20. A computer network system for an automobile, comprising:

a network;

at least one client computing device connected to the network; and a vehicle computer connected to the network to serve content to the client computing device, the vehicle computer having a computer, an open platform operating system executing on the computer, and multiple applications executing on the operating system, the multiple applications including at least one vehicle-related application and at least one non-vehicle related application.

* * * * *

UNITED STATES PATENT AND TRADEMARK OFFICE
CERTIFICATE OF CORRECTION

PATENT NO. : 6,175,789 B1
DATED : January 16, 2001
INVENTOR(S) : Richard D. Beckert et al.

It is certified that error appears in the above-identified patent and that said Letters Patent is hereby corrected as shown below:

Column 7,
Line 7, change "bard" to -- hard --.

Column 13,
Line 49, change "wen" to -- when --.

Signed and Sealed this

Twenty-fifth Day of September, 2001

Attest:

*Nicholas P. Godici*

NICHOLAS P. GODICI
*Attesting Officer*  *Acting Director of the United States Patent and Trademark Office*